(12) United States Patent
Hanya et al.

(10) Patent No.: US 6,398,533 B1
(45) Date of Patent: Jun. 4, 2002

(54) TIRE MOLD

(75) Inventors: Masahiro Hanya, Kobe; Emiko Yamamoto, Nishinomiya; Masayuki Sakamoto; Ryo Ono, both of Shirakawa, all of (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/605,745

(22) Filed: Jun. 29, 2000

(30) Foreign Application Priority Data

Jun. 29, 1999 (JP) ............................................. 11-183829

(51) Int. Cl.[7] ............................................. B29C 35/02
(52) U.S. Cl. ......................................... 425/36; 425/812
(58) Field of Search .................................... 425/36, 812

(56) References Cited

U.S. PATENT DOCUMENTS

| | | | | |
|---|---|---|---|---|
| 2,025,992 A | * | 12/1935 | Laursen | 425/36 |
| 2,734,225 A | * | 2/1956 | Glynn | 425/36 |
| 3,278,990 A | * | 10/1966 | Joseph et al. | 425/36 |
| 3,563,831 A | * | 2/1971 | Clapp et al. | 425/36 |
| 4,028,029 A | * | 6/1977 | MacMillian | 425/36 |
| 4,035,118 A | * | 7/1977 | MacMillian | 425/36 |
| 5,078,584 A | * | 1/1992 | Drewel et al. | 425/36 |
| 5,961,913 A | * | 10/1999 | Haase | 425/36 |

FOREIGN PATENT DOCUMENTS

GB 1231597 * 5/1971

\* cited by examiner

*Primary Examiner*—James P. Mackey
(74) *Attorney, Agent, or Firm*—Birch, Stewart, Kolasch & Birch, LLP

(57) ABSTRACT

A mold for a pneumatic tire with an inflatable bladder is disclosed with a pair of axially spaced bead portions each with a bead bottom surface extending from a bead toe toward the axially outside of the tire. The bladder is disposed inside the green tire in the mold and inflated to press the green tire against the inside of the mold. The mold comprises a pair of bead rings and each bead ring is provided with a bead bottom molding face for molding said bead bottom surface. Each bead ring is provided radially inside the bead bottom molding face with a protrusion protruding axially inwardly from the axially inner end of the bead bottom molding face so that the axial extent of the protrusion from the axially inner end of the bead bottom molding face is in the range of from 0.05 to 0.4 times the axial distance between the axially inner ends of the bead molding faces.

10 Claims, 8 Drawing Sheets

TIRE MOLD

BACKGROUND OF THE INVENTION

1. Field of the Invention

The present invention relates to a mold for a pneumatic tire, more particularly to a mold used with an inflatable bladder which is capable of minimizing air staying between the bladder and tire.

2. Description of Related Art

In general, during vulcanizing a pneumatic tire, as shown in FIG. 8, the inside of the green tire T in a mold (a) is pressured by a bladder (b) inflated by a heating and pressurizing medium. The bladder (b), during inflating, first contacts with the tread portion Tt and bead portion Tb, and as indicated by arrows f1 and f2, the contact region expands toward the sidewall portion. Therefore, air (e) is liable to remain between the bladder (b) and green tire T in the sidewall portion especially near the shoulder portion Ts1. The remaining air (e) partially decreases pressure which presses the green tire T against the mold (a). Therefore, carcass cord tension decreases partially, and accordingly, cord elongations, cord spacings and cord directions are liable to become ununiform, which results in deterioration of tire performances such as steering stability, road noise, force variation, bulge/dent on the tire outside, rubber bare and the like.

SUMMARY OF THE INVENTION

It is therefore, an object of the present invention to provide a tire mold for use with a bladder which can minimize air between the bladder and green tire.

According to the present invention, a tire mold comprises a pair of bead rings, each of the bead rings provided with a bead bottom molding face for molding the bead bottom surface of the tire, and further each bead ring provided radially inside the bead bottom molding face with a protrusion protruding axially inwardly from the axially inner end of the bead bottom molding face so that the axial extent of the protrusion from the axially inner end of the bead bottom molding face is in the range of from 0.05 to 0.4 times the axial distance between the axially inner ends of the bead molding faces.

DESCRIPTION OF THE DRAWINGS

Embodiments of the present invention will now be described in detail in conjunction with the accompanying drawings.

DESCRIPTION OF THE INVENTION

Figure 1:
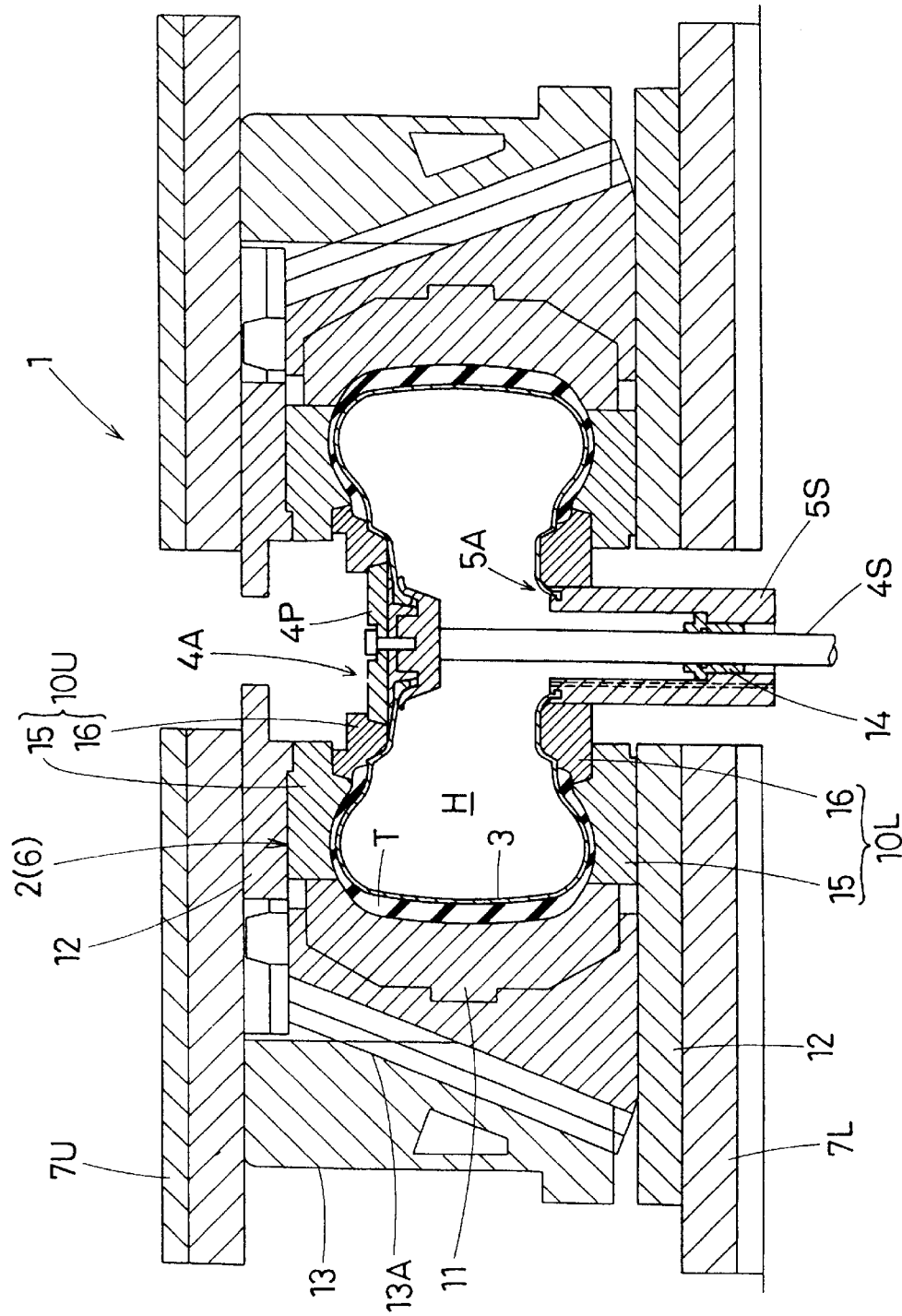
FIG. 1 is a schematic cross sectional view of an apparatus for molding a pneumatic tire with a bladder holder.

In the drawings, apparatus 1 for molding a pneumatic tire T comprises a tire mold 6 and a bladder 3.

The pneumatic tire T comprises a tread portion Tt, a pair of axially spaced bead portions Tb and a pair of sidewall portions Ts extending therebetween to have a toroidal shape.

In FIG. 1, the tire mold 6 is supported between an upper platen plate 7U and a lower platen plates 7L each provided with a heater therein. The lower platen plate 7L is mounted on a fixed table (not shown), but the upper platen plate 7U is mounted on a pressing machine (not shown) so as to be moved upward or downward by operating the pressing machine.

The tire mold 6 in this embodiment is a segmental mold comprising: a tread ring 11 for molding the outside of the tire tread Tt, which is made up of circumferentially divided sectors; and a pair of side rings 10U and 10L each of which comprises a sidewall ring 15 for molding the outside of the tire sidewall portion Ts and a bead ring 16 for molding the outside of the tire bead portion Tb. Thereby, a hollow H into which a green tire T is put is formed.

The upper and lower side rings 10U and 10L are fixed to the above-mentioned upper and lower platen plates 7U and 7L, respectively, by using retainers 12 as shown in FIG. 1.

On the radially outside of the upper side ring 10U, an actuator 13 is further fixed to the upper platen plate 7U. The actuator 13 has a radially inside, which is tapered towards the upper platen plate 7U, and on which each of the sectors 11 is mounted by means of straight bearing 13A so that each sector 11 is slidable along the taper in a direction parallel to a plane including the mold axis corresponding to the tire axis.

When the pressing machine operates to move the upper platen plate 7U upward, the upper sidewall mold 10U is moved upward, and at the same time, all the sectors 11 are first moved radially outward (away from the tread portion of the tire T) and then moved upward. Thus, the tire mold 6 opens. When the pressing machine moves the upper platen plate 7U downward, the upper sidewall mold 10U is moved downward, and at the same time, all the sectors 11 are moved downward and then radially inward. Thus, the tire mold 6 closes.

In the closed state of the mold, the tread ring 11 has a circumferentially continuously extending inner face (hereinafter, tread molding face) which is collectively formed by the inner faces of the sectors. The tread molding face continues to the inner face of each sidewall ring 15 (hereinafter sidewall molding face). The sidewall molding face continues to the inner face of each bead ring 16 (hereinafter, bead molding face 17). These molding faces are profiled according to the tire profile.

The bead molding face 17 of each of the bead rings 16U and 16L consists of a bottom molding face 17B for molding the bottom surface B2 of the tire bead portion Tb which extends from the bead toe Bt to the bead heel Bh, and an outside molding face 17A for molding the axially outer surface B1 of the tire bead portion Tb which extends radially outward from the bead heel Bh to the radially inner end of the sidewall molding face.

The bead molding face 17 is formed at the radially outer end of an annular main portion 19 of the bead ring 16. Further, each bead ring 16 is provided on the radially inside of the bead molding face 17 with at least one protrusion 20 (in this embodiment a single circumferentially continuous protrusion).

The protrusion 20 protrudes axially inwardly from the bead toe Bt. In this embodiment, however, in order to control the molded shape of the toe portion, the protrusion 20 starts to protrude from a position P spaced apart radially inwardly from the bead toe Bt by a small distance D which is more than 1.0 mm. Usually, the distance D is not more than about 15 mm. (In this example, D is about 5 mm)

The axial extent (h) of the protrusion 20 from the bead toe Bt is set in a range of from 0.05 to 0.4 times, preferably 0.15 to 0.30 times the toe width W or the axial distance between the bead toes Bt. (In this example, h is 30 mm)

Figure 6:
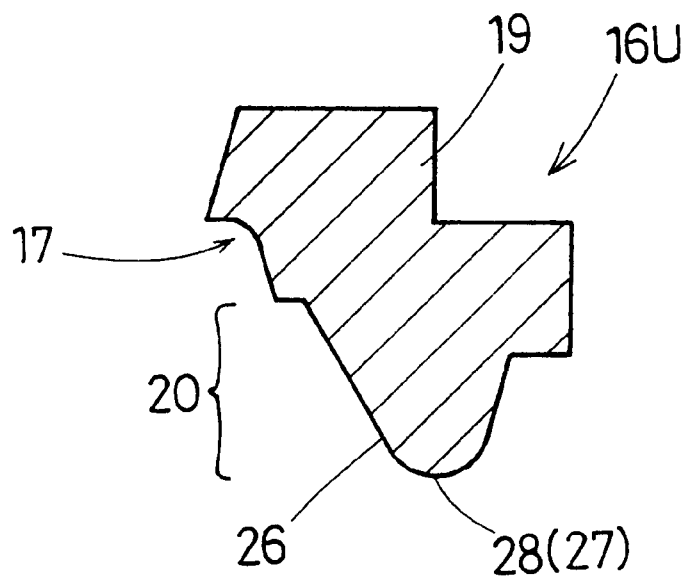
FIG. 6 is a cross sectional view showing other examples of bead rings.
Figure 6:
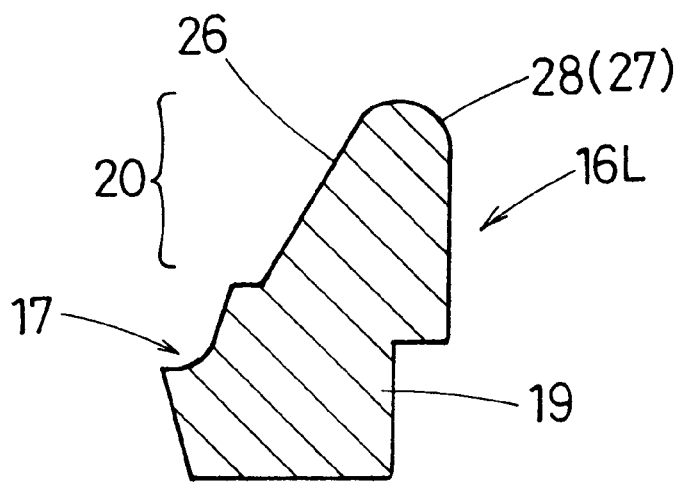

The protrusion 20 has an inclined face 26 which extends axially inward from the starting position P while inclining radially inward. The inclination angle thereof is in a range of from 50 to 90 degrees with respect to the radial direction. (In this example, 60 degrees) In a cross section including the mold axis, the inclined face 26 in this example is straight. However, the inclined face 26 may be a gentle curve, for example a convex curve. Further, each bead ring 16 is provided with an horizontal face 27 extending radially inwardly from the axially inner end 26E of the inclined face 26 in substantially parallel with the radial direction. However, as shown in FIG.6, it is also possible to provide a convexly curved face 28 having a relatively small radius of curvature instead of the horizontal face 27.

Between the starting position P and the bead toe Bt in this embodiment, each bead ring 16 is provided with a stabilizing face 21 which extends radially inward from the bead toe Bt so as to become substantially flush with the axially inside of the tire bead portion near the bead toe. The stabilizing face 21 in this example is substantially parallel with the radial direction.

Figure 4:
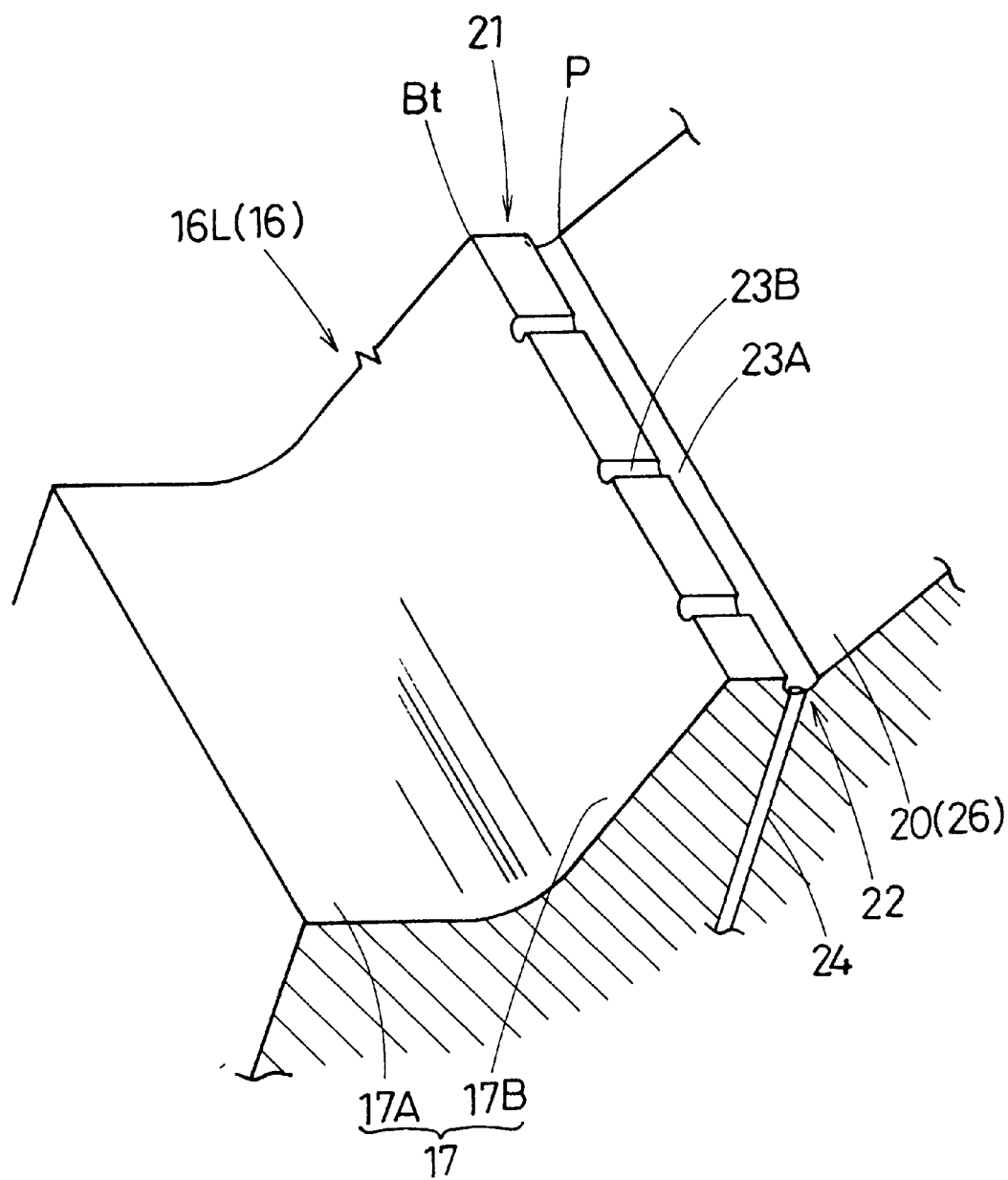
FIG. 4 is a perspective partial view of the bead ring showing vent means.

Further, between the starting position P and the bead toe Bt, each bead ring 16 is provided with vent means 22 as shown in FIG.4 to release air to the outside of the mold.

The vent means 22 comprises a circumferential vent groove 23A disposed immediately radially outside the starting position P, radial vent grooves 23B extending from the bead toe Bt to the circumferential vent groove 23A, and at least one vent hole 24 opening in the vent groove 23A and extending to the outside of the mold.

In case that the above-mentioned stabilizing face 21 is not formed, it is preferable to provide vent means 22 on the inclined face 26.

The lower bead ring 16L has a center hole 29 which is defined by a circumferentially extending radially inner surface 29A, the radially inner surface 29A extending axially outwardly from the radially inner end 27E of the horizontal face 27.

The upper bead ring 16U also has a center hole which is, in this example, a stepped hole consisting of an axially outer small-diameter hole and an axially inner larger-diameter hole 30. The axially inner larger-diameter hole 30 is defined by a circumferentially extending radially inner surface which is tapered axially outward from the horizontal face 27.

In order to press the green tire T against the inside or molding face of the tire mold 6 and vulcanizing the green tire t, the above-mentioned bladder 3 is inflated with a high-pressure hot medium (usually steam alone or mixture gas of steam and inert gas). The bladder 3 is thus made of a heat-resisting elastic material, e.g. butyl rubber and the like.

The bladder 3 extends between an upper cramp 4A and a lower cramp 5A of a bladder holder. The bladder holder further comprises a tubular shaft 5S and a center shaft 4S.

The upper end portion of the tubular shaft 5S is inserted into the above-mentioned center hole 29 of the lower bead ring 16L. The above-mentioned lower cramp 5A is provided at the upper end of the tubular shaft 5S.

The center shaft 4S is inserted in the tubular shaft 5S and slidably supported thereby with using a bearing means 14. The upper end of the center shaft 4S protrudes from the upper end of the tubular shaft 5S. The upper cramp 4A is provided at the upper end of the center shaft 4S. Further, a positioner 4P is provided upward or axially outward of the upper bladder holder 4A in order to stop and position the upper bladder holder 4A. The positioner 4P is to be inserted in the axially inner tapered hole 30 of the stepped center hole of the upper bead ring 16U and has a tapered circumferential face to fit the tapered hole 30.

By deflating the bladder 3 and moving the center shaft 4S downward, the bladder 3 can be collapsed.

Figure 2:
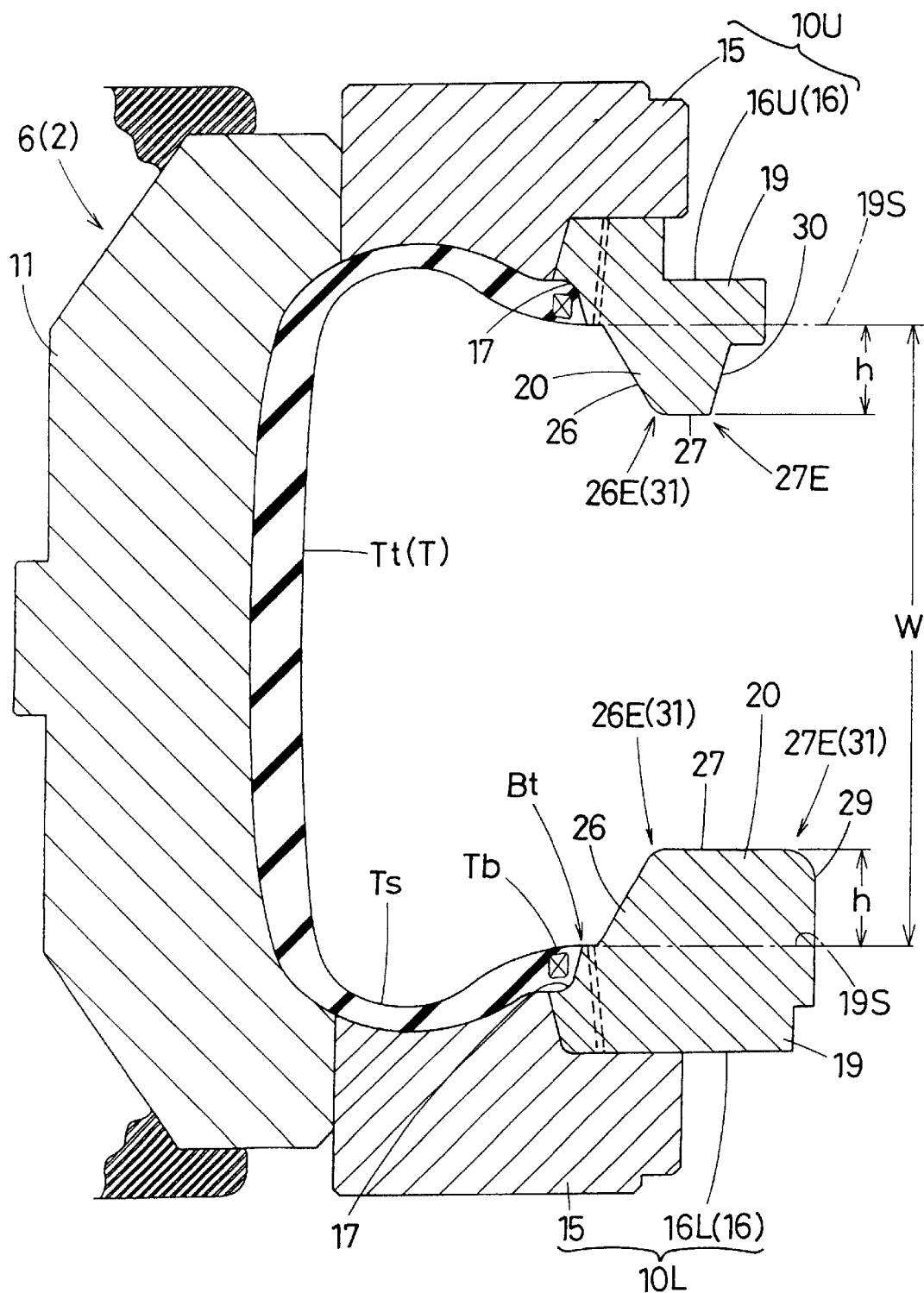
FIG. 2 is an enlarged partial cross sectional view of a tire mold according to the present invention.
Figure 3:
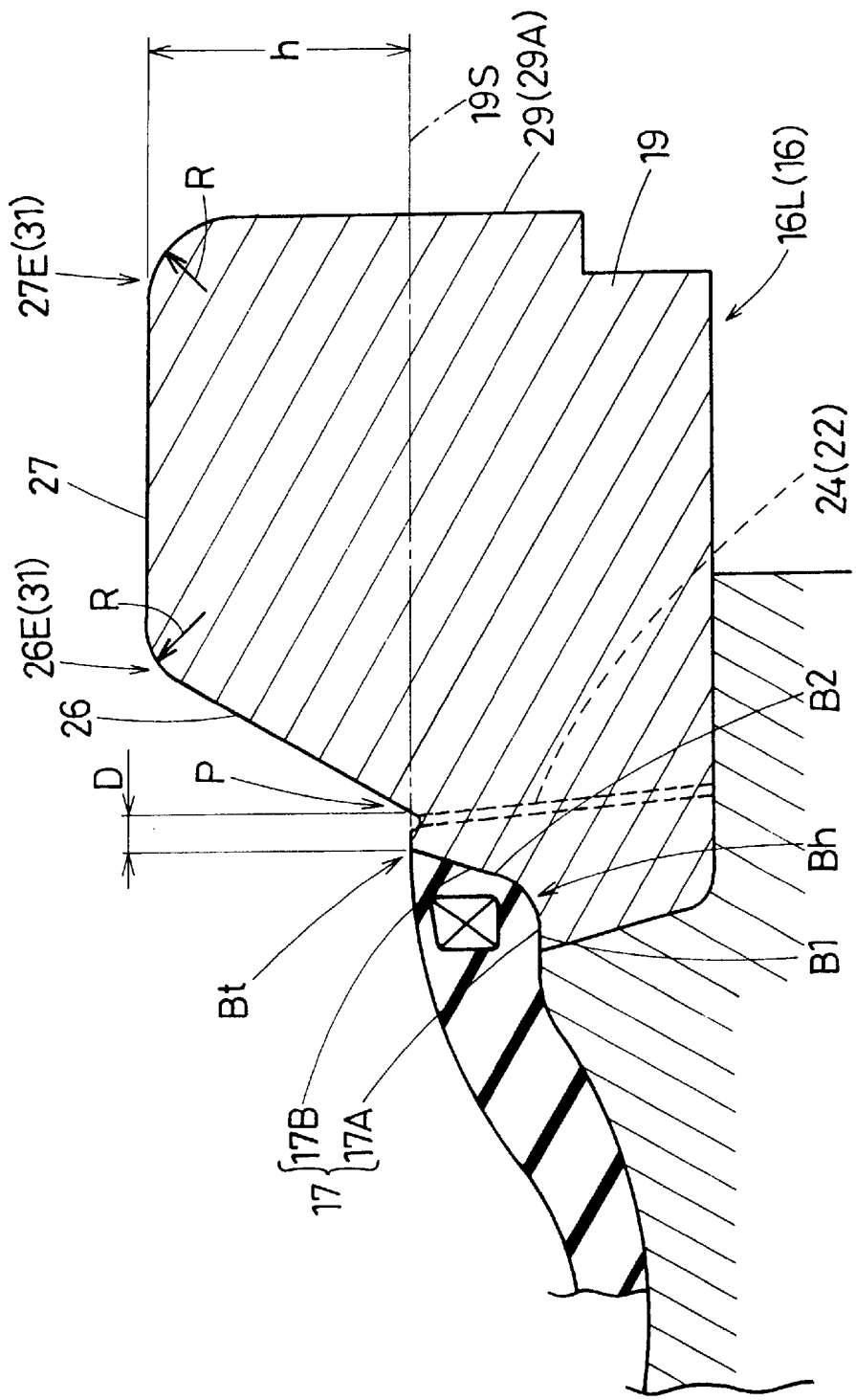
FIG. 3 is an enlarged cross sectional view of a bead ring thereof.

In order to prevent the bladder 3 from tearing, corners 31 of the protrusion 20 around which there is a possibility of the bladder extending are rounded by an arc having a radius R of curvature of from 1.0 to 20 mm. In case of FIG.2, the corner 31 around the radially outer end 26E of the upper bead ring 16U and the corners 31 around the radially outer and inner ends 26E and 27E of the lower bead ring 16L are rounded.

Figure 5:
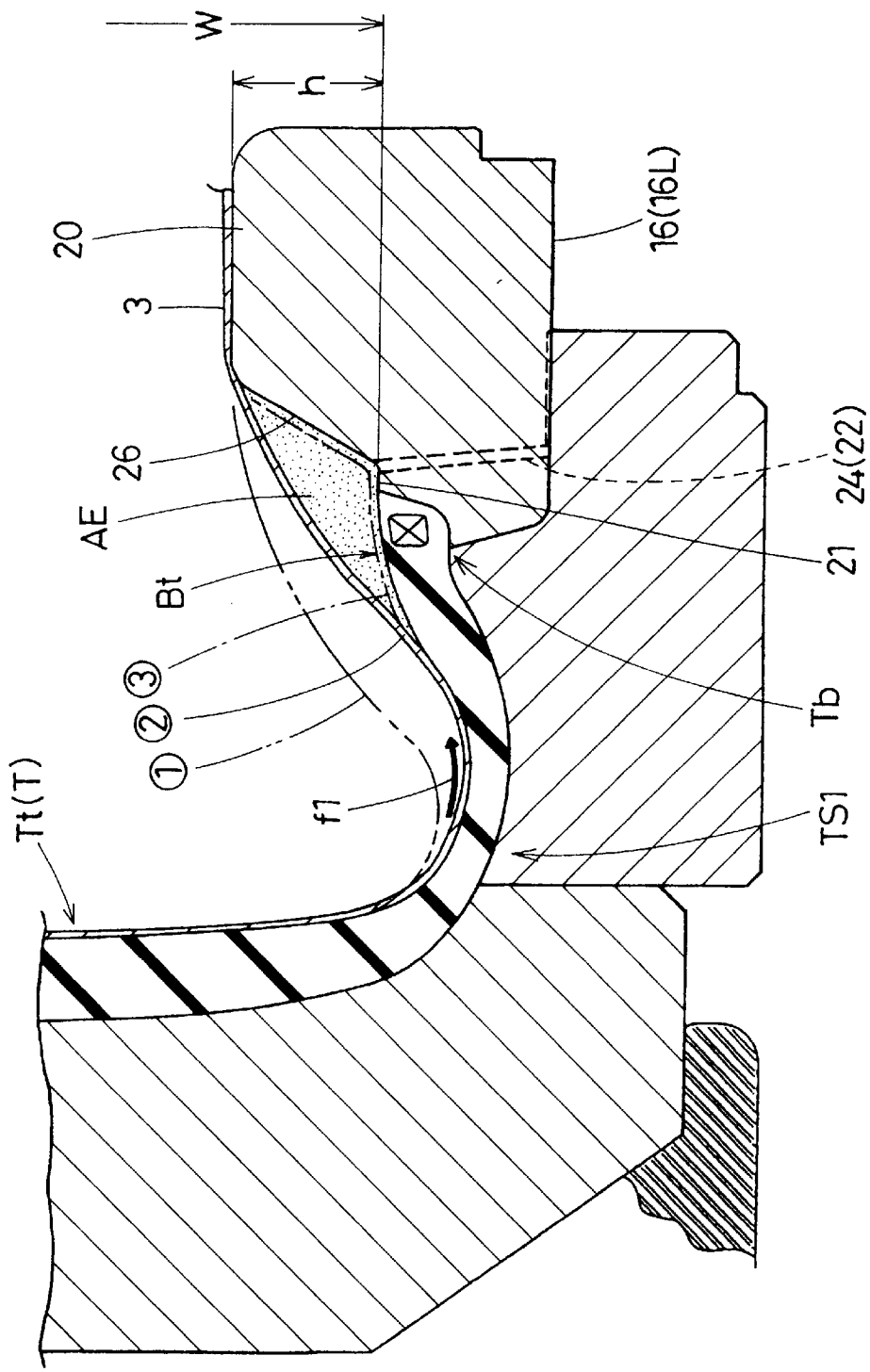
FIG. 5 is a cross sectional view for explaining the effect of the bead ring.

In the present invention, therefore, the protrusions 20 exist on the radially inside of the bead portions. Therefore, the bladder 3, when inflating, contacts with the tire inside in due order, namely, as shown in FIG.5, from the tread portion Tt (state ①)to the shoulder portion Ts1 (state ②) and then the bead toe Bt (state ③). Accordingly, it is possible to prevent air from staying between the tire T and the bladder 3. Incidentally, the air AE between the bladder 3 and green tire T and bead ring 16 can vent by the vent means 22.

Figure 7:
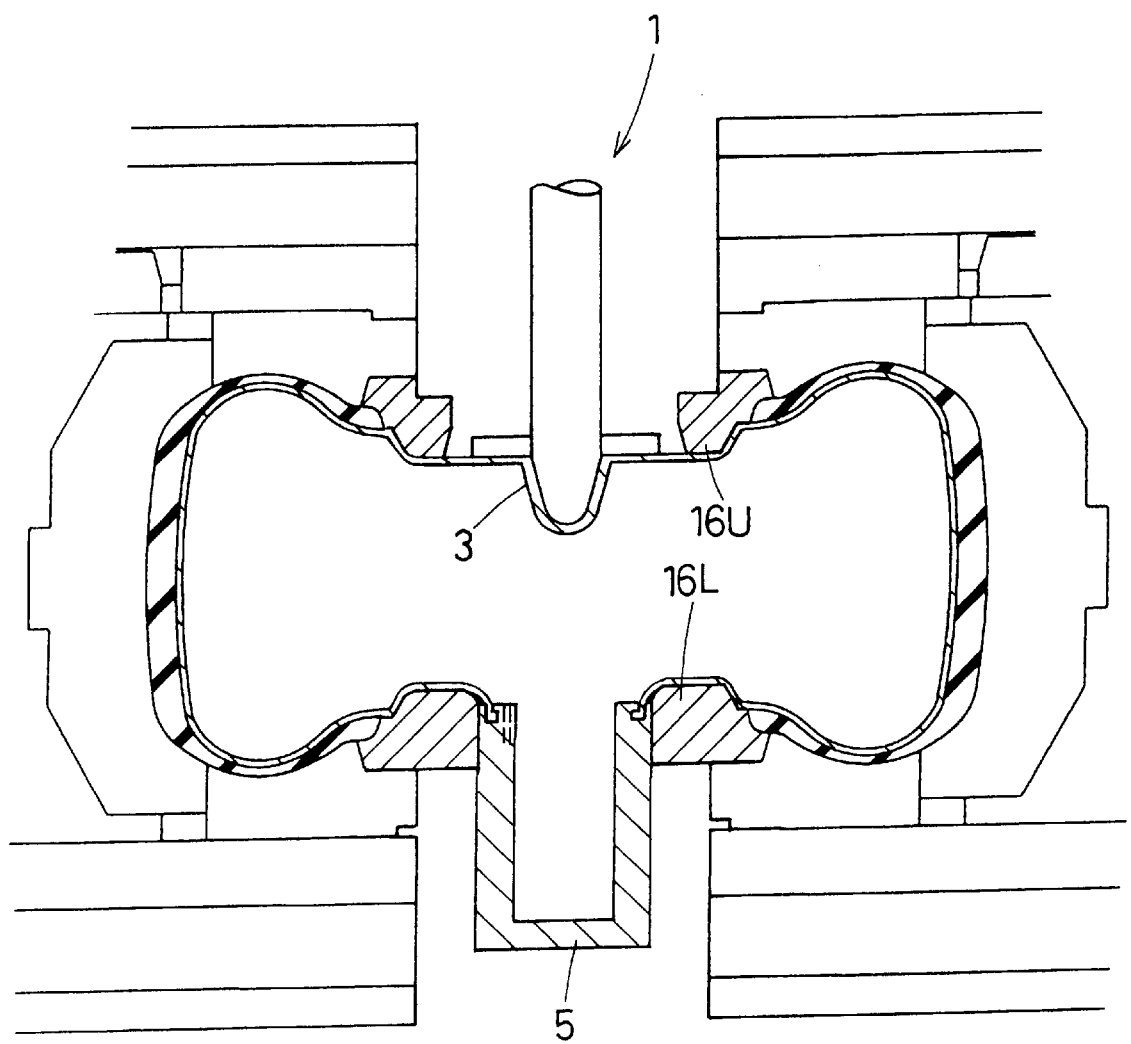
FIG. 7 is a cross sectional view of another example of an apparatus for molding a pneumatic tire with the bladder holder.
Figure 8:
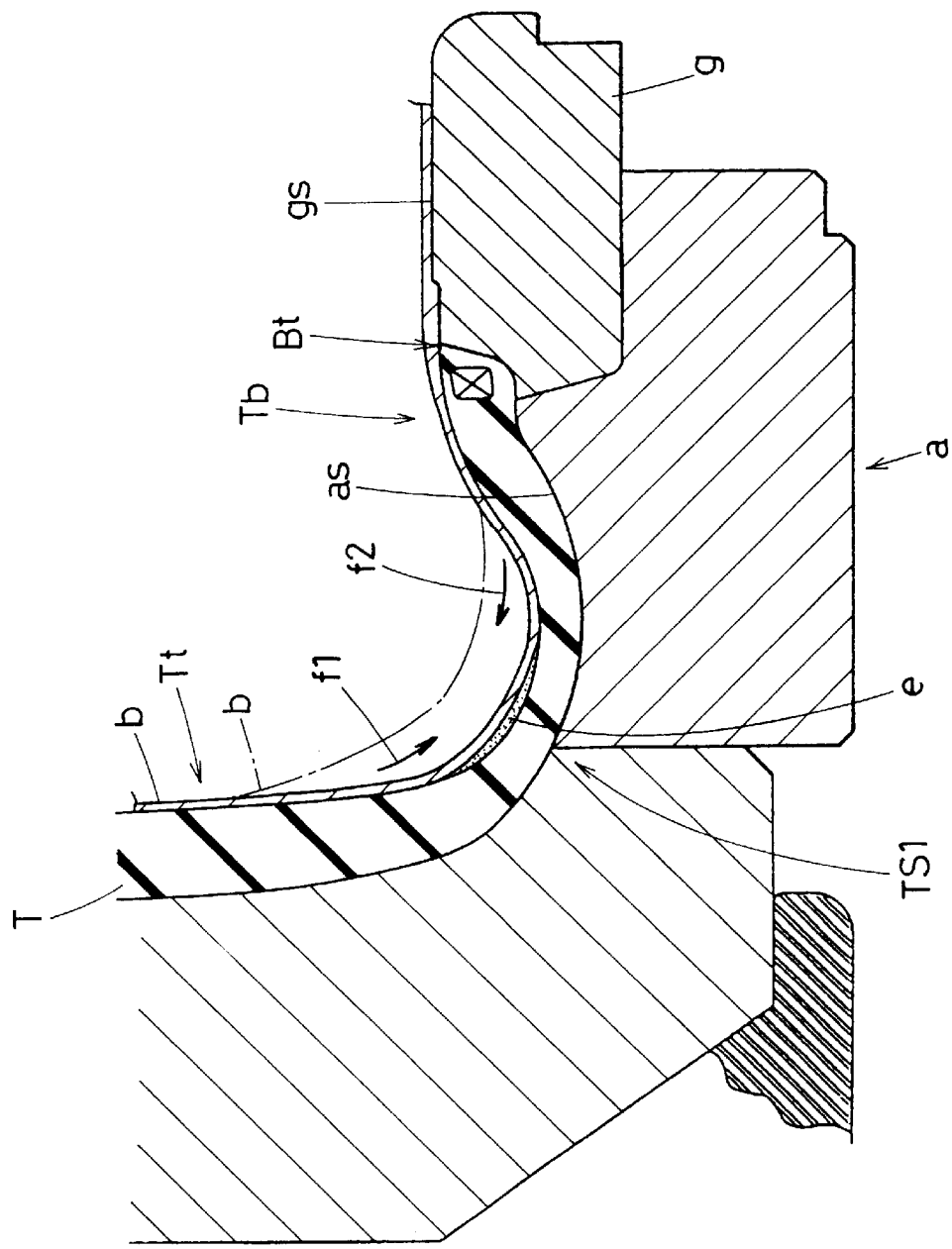
FIG. 8 is a cross sectional view showing a prior-art bead ring.

In the present invention, the tread ring 11 and sidewall rings 15 are not limited to a specific structure. For example, a so called two-piece structure can be employed instead of the structure made up of the tread ring 11 and sidewall rings. Also, the bladder holder is not limited to a specific structure. For example, as shown in FIG.7, a so called autoform press type, wherein the bladder 3 can be put away in a bag well 5 can be employed.

What is claimed is:

1. A mold for pneumatic tire used with a bladder, said pneumatic tire comprising a pair of axially spaced bead portions each with a bead bottom surface extending from a bead toe toward the axially outside of the tire, said bladder disposed inside the green tire put into the mold and inflated to press the green tire against the inside of the mold, said mold comprising a pair of bead rings, each said bead ring provided with a bead bottom molding face for molding said bead bottom surface, and each said bead ring provided radially inside said bead bottom molding face with a protrusion protruding axially inwardly from the axially inner end of the bead bottom molding face so that the axial extent of the protrusion from the axially inner end of the bead bottom molding face is in the range of from 0.05 to 0.4 times the axial distance between the axially inner ends of the bead molding faces, wherein said protrusion starts to protrude at a position which is radially inwardly spaced apart from the axially inner end of the bead bottom molding face by a small distance, and wherein air vent means are provided between the protrusion starting position and the axially inner end of the bead bottom molding face.

2. The mold according to claim 1, wherein the protrusion has an inclined face which extends axially inward from the protrusion starting position, while inclining radially inward, and the inclination angle thereof is in a range of from 50 to 90 degrees with respect to the radial direction.

3. The mold according to claim 1, wherein said air vent means comprise a circumferential groove and radial grooves extending from the circumferential groove.

4. The mold according to claim 1, wherein a corner of the protrusion around which the bladder extends at least when the bladder is inflated is rounded.

5. The mold according to claim 4, wherein said corner is rounded by an arc having a radius of from 1.0 to 20 mm.

6. An apparatus for molding a pneumatic tire, said pneumatic tire comprising a pair of axially spaced bead portions each with a bead bottom surface extending from a bead toe toward the axially outside of the tire, said apparatus comprising a tire mold in which the green tire is disposed, and a bladder which is disposed inside the green tire and inflated to press the green tire against the inside of the tire mold, said tire mold comprising a pair of bead rings, each said bead ring provided with a bead bottom molding face for molding said bead bottom surface, and each said bead ring provided with a protrusion located on the radially inside of said bead bottom molding face and protruding axially inwardly from the axially inner end of the bead bottom molding face so that the axial extent of the protrusion from the axially inner end of the bead bottom molding face is in the range of from 0.05 to 0.4 times the axial distance between the axially inner ends of the bead molding faces, wherein said protrusion starts to protrude at a position which is radially inwardly spaced apart from the axially inner end of the bead bottom molding face by a small distance, and wherein air vent means are provided between the protrusion starting position and the axially inner end of the bead bottom molding face.

7. The apparatus according to claim 6, wherein the protrusion has an inclined face which extends axially inward from the protrusion starting position, while inclining radially inward, and the inclination angle thereof is in a range of from 50 to 90 degrees with respect to the radial direction.

8. The apparatus for molding a pneumatic tire according to claim 6, wherein said air vent means comprise a circumferential groove and radial grooves extending from the circumferential groove.

9. The apparatus according to claim 6, wherein a corner of the protrusion around which the bladder extends at least when the bladder is inflated is rounded.

10. The apparatus according to claim 9, wherein said corner is rounded by an arc having a radius of from 1.0 to 20 mm.

* * * * *